United States Patent [19]

Hall

[11] Patent Number: 5,117,442
[45] Date of Patent: May 26, 1992

[54] METHODS AND CIRCUITS FOR SYNCHRONIZING SIGNALS IN A MODULAR REDUNDANT FAULT TOLERANT COMPUTER SYSTEM

[75] Inventor: Christopher M. Hall, Redwood City, Calif.

[73] Assignee: National Semiconductor Corporation, Santa Clara, Calif.

[21] Appl. No.: 284,304

[22] Filed: Dec. 14, 1988

[51] Int. Cl.⁵ .............................................. H04L 7/00
[52] U.S. Cl. ..................................... 375/107; 375/110; 371/47.1; 370/103
[58] Field of Search ........................ 375/107, 110, 106; 371/1, 47; 370/100.1, 103, 105, 106, 105.1; 377/78; 364/950, 950.3, 950.7; 328/63, 72

[56] References Cited

U.S. PATENT DOCUMENTS

| 4,232,387 | 11/1980 | Cottatellucci | 371/47 |
|---|---|---|---|
| 4,302,831 | 11/1981 | Zemanek | 375/111 |
| 4,330,826 | 5/1982 | Whiteside et al. | 364/200 |
| 4,348,762 | 9/1982 | Shiun et al. | 371/47 |
| 4,375,683 | 3/1983 | Wensley | 371/36 |
| 4,498,176 | 2/1985 | Wagner | 371/47 |
| 4,583,224 | 4/1986 | Ishii et al. | 371/36 |
| 4,589,066 | 5/1986 | Lam et al. | 371/47 |
| 4,644,498 | 2/1987 | Bedard et al. | 364/900 |
| 4,683,570 | 7/1987 | Bedard et al. | 371/36 |
| 4,692,932 | 9/1987 | Denhez et al. | 375/107 |
| 4,696,019 | 9/1987 | Tulpule et al. | 375/107 |
| 4,700,346 | 10/1987 | Chandran et al. | 361/1 |
| 4,782,499 | 11/1988 | Clendening | 375/107 |
| 4,833,695 | 5/1989 | Greub | 375/110 X |
| 4,860,322 | 8/1989 | Lloyd | 371/1 X |

Primary Examiner—Douglas W. Olms
Assistant Examiner—Ralph Smith
Attorney, Agent, or Firm—Lee Patch; Bruce D. Riter

[57] ABSTRACT

A fault tolerant circuit and method of synchronizing multiple asynchronous input signals, such as reset signals, in a modular redundant fault-tolerant computer system in which clock signals or respective slices have a bounded skew with respect to one another. The input signal and clock signal for each slice of the system are used to produce an initial synchronization signal in each slice of a first layer of the circuit. Each initial synchronization signal is used with an inverted version of each of the slice clock signals to produce, in each slice of a second layer of the circuit, a set of local synchronization signals for each slice. The local synchronization signals for each slice are passed to a majority-voter which produces a voted output signal for the slice. The voted output signal and the clock signal for each slice are then used to produce a finally synchronized output signal for that slice. The output signals for the multiple slices are synchronized to the respectively associated slice clock signals, and to one another within the bounded skew of the slice clock signals.

23 Claims, 11 Drawing Sheets

METHODS AND CIRCUITS FOR SYNCHRONIZING SIGNALS IN A MODULAR REDUNDANT FAULT TOLERANT COMPUTER SYSTEM

BACKGROUND OF THE INVENTION

1. Field of the Invention

The present invention relates to fault-tolerant computer systems, and more particularly to methods and fault-tolerant circuits for synchronizing multiple asynchronous digital signals, such as reset signals, in such systems.

2. Description of Related Art

A Triple Modular Redundant (TMR) computer system is a type of fault-tolerant computer system designed to continue operating despite a failed component or connection. In a TMR system, three or more identical processors work synchronously on the same task, with their outputs compared or "voted" by hardware or software to provide a majority answer as output. The TMR system continuously monitors each processor output so that, when a discrepancy between processor outputs is discovered, the failed processor may be disabled and operation of the remaining processors continued in a "fail operational" mode.

When only two of the processors remain in operation, the system is considered to be operating in a "pair" mode. In pair mode, the processor outputs are compared so that when a discrepancy is discovered, the system may be shut down, or "failed safe." "Pair" systems are similar to TMR systems operating in "pair" mode in that only two identical processors work synchronously on the same task and their outputs are compared to permit "fail safe" system shutdown in the event of a discrepancy.

Synchronized, or lockstepped, operation of processors in a Pair or TMR system is predicated on synchronization of the processors. If the system is truly redundant, a separate source of clock signals is provided for each processor. All processors are synchronized initially upon start-up, and may be periodically synchronized thereafter to correct for signal timing divergence which may occur during operation of the system. Given a bounded displacement of clock edges ("skew") of each processor relative to those of the other processors, all processors must start on "the same" clock edge. For example, if clock skew is $\sim\frac{1}{4}$ of a full cycle of the clock signal, it is not acceptable to have one processor start $\frac{3}{4}$, 1 or $1\frac{1}{4}$ cycle earlier or later than the other(s).

In addition to clock skew, the TMR system must be able to cope with early or late arrival or non-arrival of one or more signal input events. It is known in the art that if a transition event is presented to the inputs of two or more clocked circuits (e.g., edge-latched D-type flip-flops), the corresponding event appearing at their outputs may differ in time (signal timing divergence). If the signal timing divergence becomes as great as one clock period, cycle skipping can occur. This is especially likely if the input changes near the minimum setup time to a clock edge, and the clock signals are skewed by a finite amount or the logic delays of the flip-flops differ slightly. Thus, even a single event can cause discrepancies when multiple clocks, or distributed versions of a single clock, are used in a TMR or Pair system. There is an even greater likelihood of discrepancy when multiple events or multiple copies of a single event must be coordinated, as in a TMR or Pair system.

Another problem which can occur is metastability of a flip-flop, where its output becomes indeterminate when its input changes near the minimum setup time to a clock edge, for example. It is also known that if a component, wire or solder connection fails, an expected event may not arrive when and where expected.

Prior art systems which address certain aspects of synchronizing digital signals are known. For example, U.S. Pat. No. 4,232,387 to Cottatellucci discloses a data transmission system in which is single received signal is split, phase-shifted and recombined to derive a synchronization waveform of use in decoding the received signal. Further, U.S. Pat. No. 4,302,831 to Zemanek discloses a data transmission system in which a time interval, derived from a received initialsynchronization word, is adjusted to keep step with phase variations in the remainder of a message arriving on a single line. Phase comparison is employed as a step in determining whether and how much to adjust the period of a clock generator.

Also known, from U.S. Pat. No. 4,348,762 to Shiun et al., is a circuit for correcting clock pulses used to read data. A plurality of groups of clock pulses of different phase is generated, one of such groups is used to read data, and a switch responsive to misreading of data with the aid of such group selects another group or groups of pulses until correct data reading is accomplished.

The disclosures mentioned above do not, however, deal with the problems of multiple logical signals and multiple, skewed clock signals encountered in TMR and Pair systems. Nor do they address the need for fault-tolerant production of the digital signal in TMR and Pair systems.

Systems achieving fault tolerance by means of majority voting are known in the art. For example, U.S. Pat. No. 4,375,683 to Wensley discloses a fault-tolerant computational system having a voter circuit which receives data inputs from several computation devices and produces an output in agreement with a majority of the inputs. A clock circuit counts pulses from the clocks of the computation devices and employs majority voting to produce a single signal for synchronizing the data output of the computational devices. Such a system does not, however, serve to resynchronize data in the voter circuit, nor does it provide multiple fault-tolerant copies of the voted output.

In addition, U.S. Pat. No. 4,583,224 to Ishii et al. discloses a fault-tolerable redundant control system in which majority logic is used with error-detection logic to detect faults. The Ishii et al. disclosure does not, however, address the synchronization of signals associated with skewed clocks.

U.S. Pat. No. 4,330,826 to Whiteside et al. discloses a synchronizer module for each processor of a fault-tolerant multiple computer system in which a sampling period is timed, the majority vote of the samples from the processors is taken, and the sampling period is adjusted so that its end will approximately coincide with the end of the sampling periods of the other processors. While the synchronizer modules permit late starting of one or more processors in the system, and is intended to identify processors which are out of synchronization with the system for fault-detection purposes, it does not appear to synchronize the logical signals of multiple processors within the bounds of the skew between clock signals of the processors.

Further, U.S. Pat. No. 4,589,066 to Lam et al. discloses fault-tolerant synchronization for multiple processor systems in which majority voting is used to determine whether synchronizing pulses arrive within a predetermined time window defined by a counter, indicating synchronization between multiple processors. Since the synchronization is linked to a time window, it has the disadvantage of being less fine-grained than may be desired.

U.S. Pat. No. 4,644,498 to Bedard et al. discloses a fault-tolerant real time clock for a TMR system. Voted master clock pulses in each of several subcircuits are counted to produce real time clock pulses which are in turn majority-voted to produce voted real time clock pulses. U.S. Pat. No. 4,683,570 to Bedard et al. further discloses use of majority voting logic to detect and indicate failure of a clock circuit. Rather than addressing the mutual synchronization of logical control signals within the bounds of the skew between the clock signals of multiple processors, these disclosures are concerned with generation of voted clocks and with detection of a failure in the voted clock circuitry.

Synchronization circuits which address the possibility of a metastable flip-flop state are also known. U.S. Pat. No. 4,498,176 to Wagner discloses error-free synchronization of asynchronous pulses in which a flip-flop circuit compares its outputs with a predetermined voltage to determine whether the circuit is in a metastable state and temporarily inhibits its outputs if a metastable state is present. This arrangement does not, however, address the synchronization of multiple signals or offer fault-tolerance.

Another arrangement, disclosed in U.S. Pat. No. 4,700,346 to Chandran et al., employs a single clock to synchronize the skewed leading edges of a true-complement signal pair. Several D-type flip-flop stages in two halves of the circuit are driven by the single clock, the second of the stages preventing metastable states from reaching the synchronizer output. This arrangement does not address the problems arising from use of multiple, skewed clocks.

None of the above-referenced patents is understood to teach methods or circuits for synchronizing logical control signals in fault-tolerant modular redundant systems which provide for: (a) synchronization of each logical control signal to the clock signal of the processor to which it is to be applied; (b) mutual synchronization of the logical control signals to be applied to the processors, within the bounds of the skew between the clock signals of the processors; and (c) fault-tolerant production of the logical control signals. It is broadly an object of the present invention to provide such methods and circuits.

It is further an object of the present invention to provide apparatus and methods for mutually synchronizing multiple, possibly asynchronous, digital input signals within the limits of bounded skew between clock signals associated respectively with the input signals. The methods and apparatus of the present invention may be used to synchronize logical control signals (such as processor reset signals, clock synchronization signals, external direct memory access (DMA) request signals, interrupt signals, and the like) for use in fault-tolerant modular redundant computer systems.

Yet another object of the present invention is to provide such apparatus and methods which are themselves redundant and fault-tolerant.

These and other objects of the invention will become apparent to those skilled in the art from the description which follow.

SUMMARY OF THE INVENTION

The present invention provides methods and fault-tolerant circuits for synchronizing multiple asynchronous digital signals, such as reset signals. It takes multiple, possibly asynchronous, digital signals as inputs, uses a like number of clock signals of bounded skew with respect to one another, and produces a set of output signals which are mutually synchronized within the limits of the bounded skew. The synchronized output signals may be used, for example, to initiate synchronized operation of a TMR computer system. The fault-tolerant nature of the inventive methods and circuits provide that, if any one wire or component of the inventive circuits should fail, a TMR system in which they are included may continue operating either as a triple system or in a "fail operational" pairs mode.

The circuits are designed such that a "slice" of circuitry is provided to handle each of the digital input signals. In a TMR system, three such slices may be provided. Each "slice" has a four layers of circuitry, performing respective steps of synchronization, as follows: (1) initial synchronization, (2) local synchronization, (3) comparison (such as two-of-three voting), and (4) final synchronization.

In a preferred embodiment, the invention includes methods and circuits for synchronizing multiple digital input signals, where each input signal is associated with a clock signal and the clock signals have a defined period and are of bounded skew relative to one another. For each input signal, an initial synchronization signal is produced which corresponds to the input signal and which is synchronized to a first edge of the associated clock signal. For each clock signal, a set of local synchronization signals is then produced which corresponds to the initial synchronization signals and which are synchronized to a second edge of the clock signal, the second edge being out of phase with respect to the first edge by one-half of the defined period. Each set of local synchronization signals is then compared to produce a comparison output signal. A final synchronization signal is then produced for each comparison output signal, each of the final synchronization signals being synchronized with a third edge of the same clock signal with which the set of local synchronization signals used to produce the comparison output signal was synchronized, the third clock edge being in phase with the first clock edge. Thus, the final synchronization signals are mutually synchronized within the limits of the bounded skew.

Additional features of the invention will become apparent to those of skill in the art from the accompanying drawings and detailed description which follows.

DETAILED DESCRIPTION OF THE INVENTION

For purposes of the following discussion, it is assumed that, in a TMR system, three "slices" of logic circuitry operate in parallel, each having a respective clock signal C1, C2 or C3. The clock signals are produced by any conventional manner, are of the same nominal frequency, and are nominally in synchrony, but may be skewed with respect to one another by up to $\frac{1}{4}$ of a clock cycle. The skew may be caused by any of a number of factors, such as propagation delays, variations of gate delays, and the like, even if they are all generated from a single master clock.

Before describing the preferred embodiments of the invention with reference to FIGS. 5-13, certain timing difficulties which may arise in a TMR system having multiple, skewed clock signals will be described with reference to FIGS. 1-4.

Figure 1:
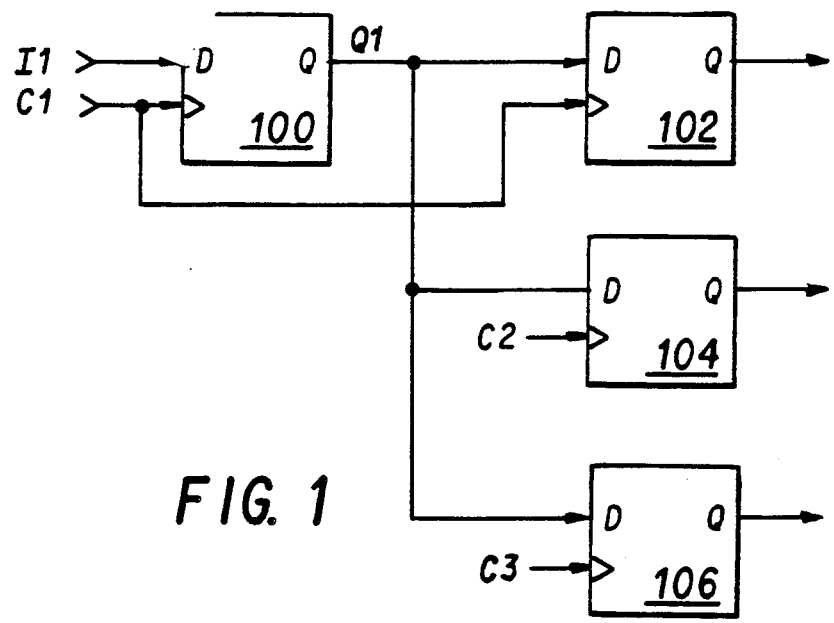
FIGS. 1 and 2 illustrate timing difficulties which can arise with synchronization of signals in a TMR system having multiple, skewed clock signals.
Figure 2:
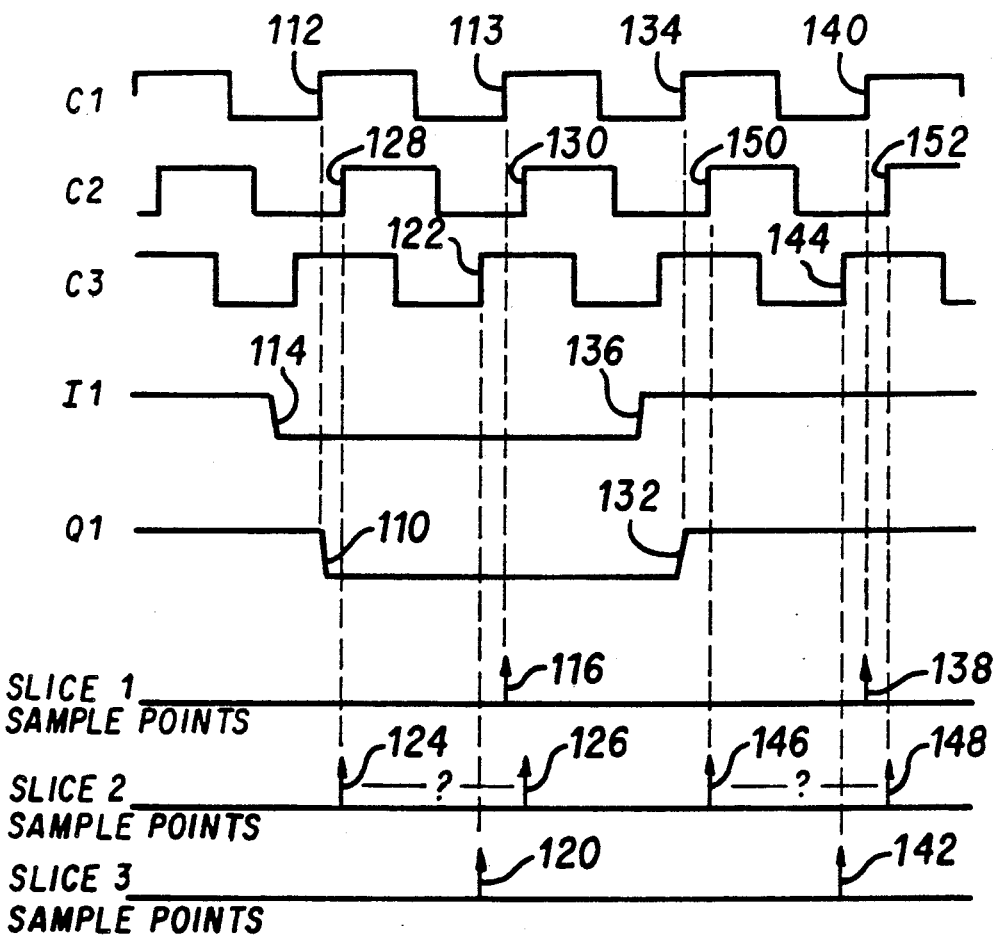

FIGS. 1 and 2 illustrate timing difficulties which can arise in the synchronization of signals in a TMR system having multiple, skewed clock signals. As shown in FIG. 1, a D-type edge-latched flip-flop 100 receives at its D input a digital signal I1 (such as a reset signal to be applied to all three processors of a TMR system) and at its clock input a slice 1 clock signal C1, and provides at its Q output a digital signal Q1. Signal Q1 is provided to downstream logic circuitry in each of slices 1, 2 and 3 in the TMR system, such as flip-flops 102, 104 and 106, respectively. Slice 1 flip-flop 102 detects changes of state of signal Q1 at rising edges of slice 1 clock signal C1, slice 2 flip-flop 104 detects changes of state of signal Q1 at rising edges of slice 2 clock signal C2, and slice 3 flip-flop 106 detects changes of state of signal Q1 at rising edges of slice 3 clock signal C3.

As shown in the timing examples of FIG. 2, signal Q1 changes state at 110 when flip-flop 100 detects the first leading edge 112 of clock signal C1 following a change of state 114 of input signal I1. Slice 1 flip-flop 102 detects the change of state 110 of signal Q1 at a sample point 116 in response to rising edge 118 of slice 1 clock signal C1. Sample point 116 and the other sample points referenced below are shown in timing relation to signals C1, C2, C3, I1 and Q1.

Also as shown in FIG. 2, slice 3 clock signal C3 is slightly advanced with respect to slice 1 clock signal C1. Slice 3 flip-flop 106 detects the change of state 110 of signal Q1 at a sample point 120 in response to rising edge 122 of slice 3 clock signal C1. The time difference between rising edge 122 of clock signal C3 and rising edge 118 of clock signal C1 represents the skew between the slice 1 and slice 3 clock signals during the time interval shown in FIG. 2.

However, clock signal C2 is slightly retarded with respect to clock signal C1, so the slice 2 flip-flop 104 receiving signal Q1 may detect the change of state 110 of signal Q1 at either of sample points 124 or 126 in response to respective rising edges 128 or 130 of clock signal C2, depending upon how close in time rising edge 128 is to the change of state 110 of signal Q1, and the set-up time required by flip-flop 104.

Similarly, signal Q1 changes state at 132 when flip-flop 100 detects the first leading edge 134 of clock signal C1 following a change of state 136 of signal I1. Slice 1 flip-flop 102 detects the change of state 132 of signal Q1 at a sample point 138 in response to rising edge 140 of slice 1 clock signal C1. Slice 3 flip-flop 106 detects the change of state 132 of signal Q1 at a sample point 142 in response to rising edge 144 of slice 3 clock signal C3. The time difference between rising edge 144 of clock signal C3 and rising edge 140 of clock signal C1 is within the skew between the respective slice 1 and slice 3 clock signals, C1 and C3. However, slice 2 flip-flop 104 receiving signal Q1 may detect the change of state 132 of signal Q1 at either of sample points 146 or 148 in response to respective rising edges 150 or 152 of clock signal C2, depending upon how close in time rising edge 150 is to the change of state 132 of signal Q1 and the set-up time required by flip-flop 104.

As a result of such ambiguities, a signal setup violation may occur in slice 2 flip-flop 104, causing its output to assume an incorrect or metastable state. Thus, slice 2 can lose lockstep operation with slices 1 and 3, and slice 2 may be perceived by the TMR system to have failed. Moreover, since all three slices of the TMR system depend on single wires carrying signals I1 and Q1, a single wire failure can result in failure of the entire system.

Figure 3:
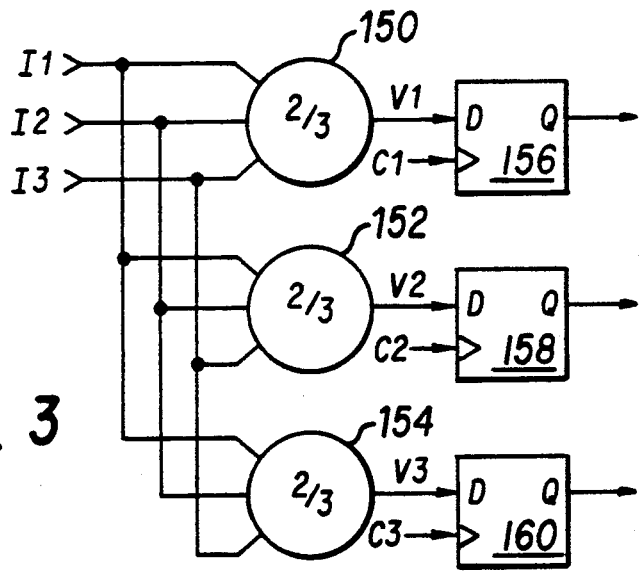
FIGS. 3 and 4 illustrate further timing difficulties which can arise with majority voting of signals in a TMR system having multiple, skewed clocks.
Figure 4:
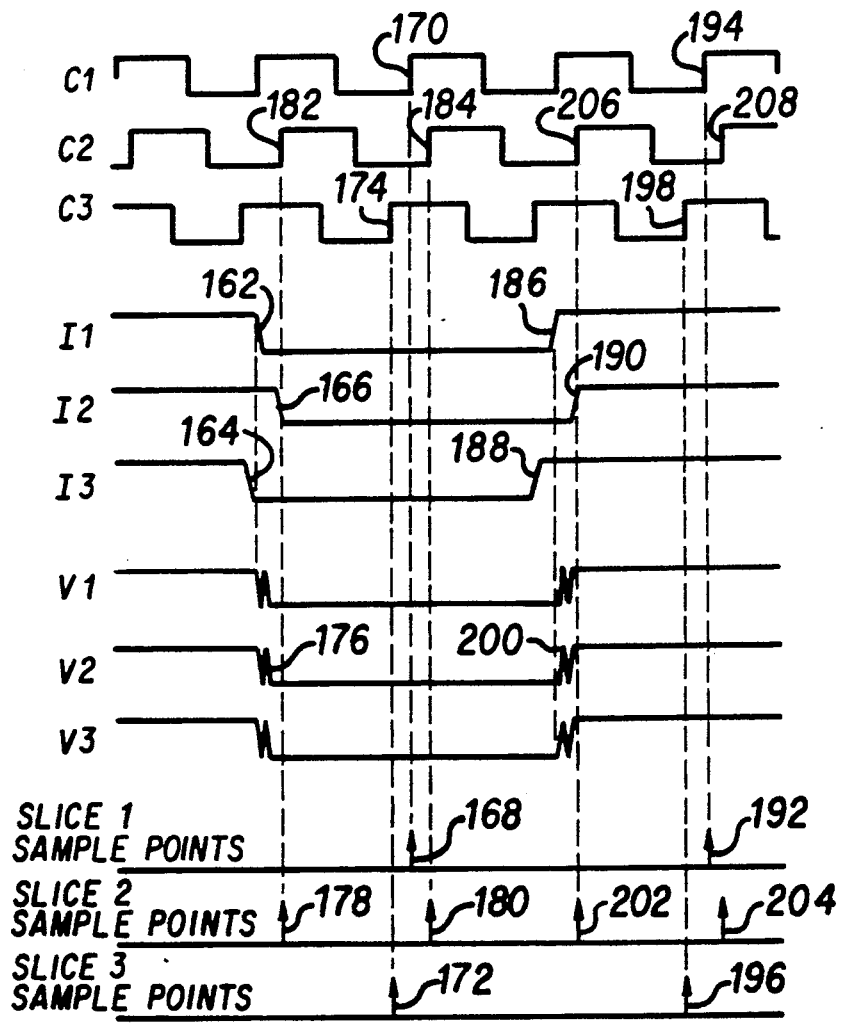

FIGS. 3 and 4 illustrate timing difficulties which can arise with use of majority voting in a TMR system having multiple, skewed clocks. As shown in FIG. 3, each of three conventional majority-voter circuits 150, 152 and 154 is coupled to receive input signals I1, I2 and I3 associated respectively with slices 1, 2 and 3 of a TMR system. Each of voter circuits 150, 152 and 154 provides at its output a respective one of voter output signals V1, V2 and V3, representing a majority vote of the voter circuit input signals, to the D input of a respective one of flip-flops 156, 158 and 160. Slice 1 flip-flop 156 detects changes of state of voter signal V1 at rising edges of slice 1 clock signal C1, slice 2 flip-flop 158 detects changes of state of voter signal V2 at rising edges of slice 2 clock signal C2, and slice 3 flip-flop 160 detects changes of state of voter signal V3 at rising edges of slice 3 clock signal C3. The voting performed by voter circuits 150, 152, 154 is an asynchronous logical operation, and does not imply any relationship to system timing, other than a delay parameter associated with the voting logic. It does not, by itself, provide synchronized output.

As shown in FIG. 4, clock signals C1, C2 and C3 are skewed with respect to one another: slice 2 clock signal C2 is slightly delayed with respect to slice 1 clock signal C1, and slice 3 clock signal C3 is slightly advanced with respect to slice 1 clock signal C1. FIG. 4 further shows each of input signals I1, I2, I3 changing state just following a rising edge of the clock signal for its slice. Thus, the change of state of input signals I1, I2 and I3 is within the skew between the respective clock signals. Since the input signals to voter circuits 150, 152 and 154 are identical, each of voter output signals V1, V2 and V3 will change state at the same time, i.e., at the instant when two of the three input signals I1, I2 and I3 have changed state. In the example of FIG. 4, all of the voter output signals V1, V2 and V3 change from a "high" to a "low" logic level when input signal I1 changes from a "high" to a "low" logic level at 162, since the change of state of input signal I3 at 164 leads the change of state of input signal I1 at 162 and the change of state of input signal I2 at 166 and the change of state of input signal I1 at 162 leads the change of state of input signal I2 at 166. The voter output signals V1, V2 and V3 are shown as taking some time to settle when changing state.

Downstream logic in slice 1 (flip-flop 156) detects a change of state of voting circuit output signal V1 at a sample point 168, in response to rising edge 170 of slice 1 clock signal C1. Downstream logic in slice 3 (flip-flop 160) detects a change of state of voter output signal V3 at a sample point 172 in response to rising edge 174 of clock signal C3. However, downstream logic in slice 2 (flip-flop 158) may detect a change of state 176 in voter signal V2 at either of sample points 178 or 180, in response to respective rising edges 182 and 184 of slice 2 clock signal C2, depending upon how close in time rising edge 182 is to the change of state 176 of voter signal V2 and the set-up time required by slice 2 flip-flop 158.

Similarly, all of the voter output signals V1, V2 and V3 change from a "low" to a "high" logic level when input signal I1 changes from a "low" to a "high" logic level at 186, since the change of state of input signal I3 at 188 leads the change of state of input signal I1 at 186 and the change of state of input signal I2 at 190 and the change of state of input signal I1 at 186 leads the change of state of input signal I2 at 190. Slice 1 flip-flop 156 detects a change of state of voter output signal V1 at sample point 192, in response to rising edge 194 of slice 1 clock signal C1. Slice 3 flip-flop 160 detects a change of state of voter output signal V3 at a sample point 196 in response to rising edge 198 of clock signal C3. However, slice 2 flip-flop 158 may detect a change of state 200 in voter output signal V2 at either of sample points 202 or 204, in response to respective rising edges 206 and 208 of slice 2 clock signal C2, depending upon how close in time rising edge 206 is to the change of state 200 of voter output signal V2 and the set-up time required by slice 2 flip-flop 158.

As a result of such ambiguities, the output of slice 2 flip-flop 158 may assume an incorrect or metastable output state. Thus, slice 2 may lose lockstep operation with slices 1 and 3, and slice 2 may be perceived by the TMR system to have failed. It is to be noted that the timing example of FIG. 4 results in perceived failure of slice 2 even though all three input signals I1, I2 and I3 are logically correct and are correctly timed relative to their respective associated clock signals C1, C2 and C3. If one of input signals I1 or I3 fails to arrive or is incorrect, the result can be a total system failure, since no two slices will be perceived to be synchronized for continued Pairs operation in a fail-operational mode.

A first preferred embodiment of the invention which overcomes such timing 1ifficulties will now be described with reference to FIGS. 5 and 6. As shown in the block diagram of FIG. 5, a first preferred embodiment of a circuit according to the invention comprises three "slices" of circuitry (from top to bottom, slice 1, slice 2 and slice 3), each of which receives a respective one of input reset signals Reset 1, Reset 2 and Reset 3, and a respective associated clock signal BCLK 1, BCLK 2 or BCLK 3. Each "slice" of circuitry comprises four "layers" of circuitry (from left to right) which perform, respectively, (1) initial synchronization, (2) local synchronization, (3) comparison, such as two-of-three voting, and (4) final synchronization. The circuit of FIG. 5 provides at its outputs three mutually-synchronized, fault-tolerant reset output signals (FT Reset 1, FT Reset 2 and FT Reset 3), as will be explained below with reference to FIG. 6.

Input reset signals Reset 1, Reset 2 and Reset 3 and clock signals BCLK 1, BCLK 2 and BCLK 3 may be supplied by respective modules of, for example, a triple-modular redundant fault-tolerant computer system. Input reset signals Reset 1, Reset 2 and Reset 3 are possibly asynchronous with respect to one another, and clock signals BCLK 1, BCLK 2 and BCLK 3 are of bounded skew with respect to one another. The bounded skew is assumed to be, for example, not more than $\frac{1}{4}$ clock cycle. The reset output signals FT Reset 1, FT Reset 2 and FT Reset 3 may be used, for example, to initiate lockstepped, synchronized operation of processor modules of the TMR computer system. The circuit of FIGS. 5 and 6 is designed to be fault-tolerant, such that if any one wire or element of the circuit fails, two or three of output reset signals FT Reset 1, FT Reset 2 and FT Reset 3 will still be generated, allowing synchronized operation of the computer system to continue.

Figure 5:
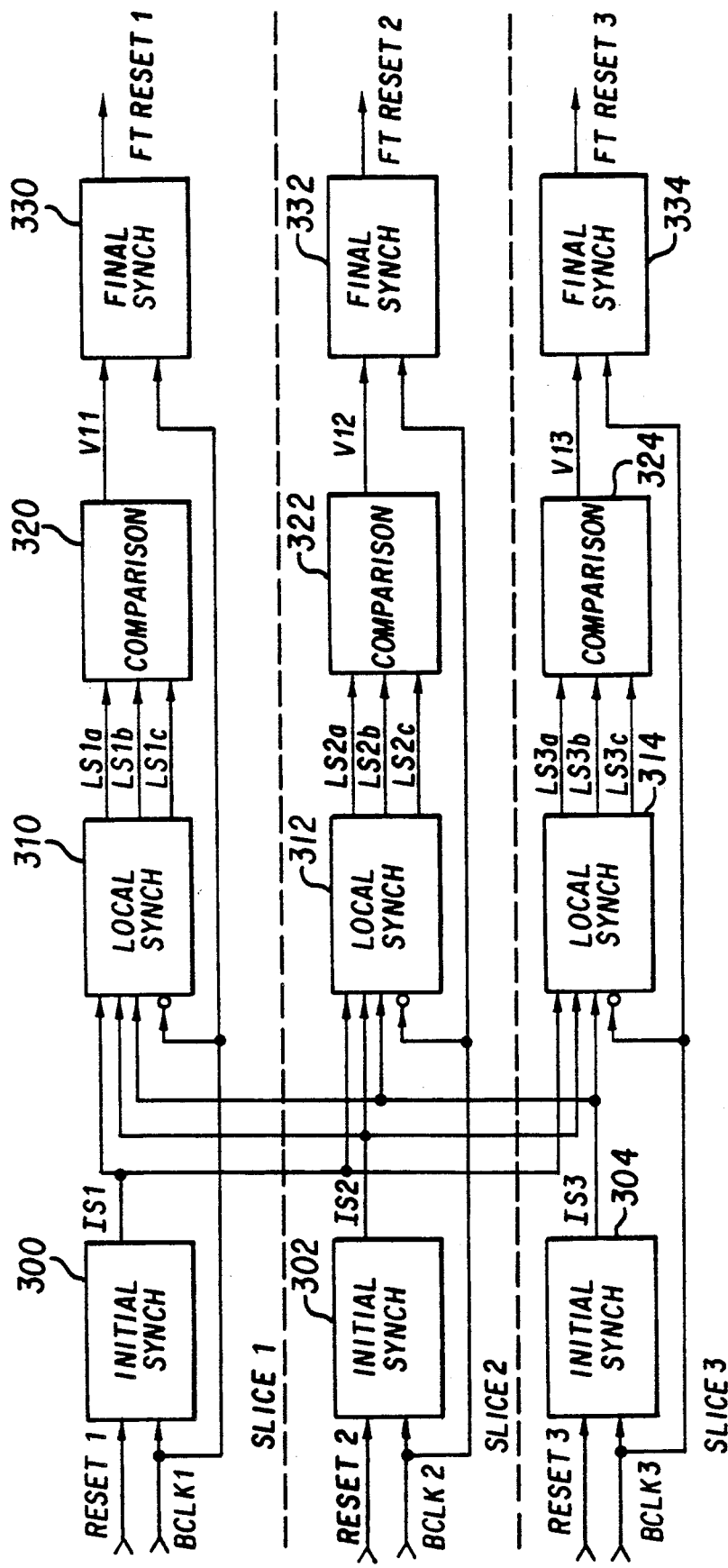
FIG. 5 shows a block diagram of a first preferred embodiment of a circuit according to the invention.

The initial synchronization layer of FIG. 5 comprises circuits 300, 302 and 304 of slices 1, 2 and 3, respectively. The initial synchronization layer synchronizes the raw (asynchronous) reset input signals Reset 1, Reset 2 and Reset 3 to rising edges of respectively associated slice 1, slice 2 and slice 3 clock signals BCLK 1, BCLK 2 and BCLK 3, to produce respective slice 1, slice 2 and slice 3 initial synchronization signals IS1, IS2 and IS3.

The local synchronization layer comprises circuits 310, 312 and 314 of slices 1, 2 and 3, respectively. Each of local synchronization circuits 310, 312 and 314 receives all three initial synchronization signals IS1, IS2 and IS3, and a respective one of clock signals BCLK 1, BCLK 2 or BCLK 3, and produces a set of local synchronization signals. The slice 1 local synchronization layer 300 produces a set of local synchronization signals LS1a, LS1b and LS1c synchronized to a falling edge of slice 1 clock signal BCLK 1, the slice 2 local synchronization layer produces a set of local synchronization signals LS2a, LS2b and LS2c synchronized to a falling edge of slice 2 clock signal BCLK 2, and the slice 3 local synchronization layer produces a set of local synchronization signals LS3a, LS3b and LS3c synchronized to a falling edge of slice 3 clock signal BCLK 3.

The comparison layer of the circuit of FIG. 5 comprises, for each slice, a respective comparison circuit 320, 322 or 324. In a TMR system, each of comparison circuits 320, 322 and 324 may be a two-of-three majority voting circuit. The comparison circuit for a given slice receives the local synchronization signals for that slice and provides a respective voted output signal representing the majority vote of the logic states of the local synchronization signals for that slice. As shown in FIG. 5, slice 1 local synchronization signals LS1a, LS1b and LS1c are provided to the slice 1 comparison circuit 320, which produces a slice 1 voted output signal V11. Slice 2 local synchronization signals LS2a, LS2b and LS2c are provided to the slice 2 comparison circuit 322, which produces a slice 2 voted output signal V12. Slice 3 local synchronization signals LS3a, LS3b and LS3c are provided to the slice 3 comparison circuit 324, which produces a slice 3 voted output signal V13.

The final synchronization layer of each slice receives the voted output signal for that slice and synchronizes it to a rising edge of the respective clock signal for that slice to produce a final output signal. Thus, slice 1 final synchronization circuit 330 receives slice 1 voted output signal V11 and synchronizes it to a rising edge of the slice 1 clock signal BCLK 1 to produce a slice 1 final output signal FT Reset 1. Slice 2 final synchronization circuit 332 receives slice 2 voted output signal V12 and synchronizes it to a rising edge of the slice 2 clock signal BCLK 2 to produce a slice 2 final output signal FT Reset 2. Slice 3 final synchronization circuit 334 receives slice 3 voted output signal V13 and synchronizes it to a rising edge of the slice 3 clock signal BCLK 3 to produce a slice 3 final output signal FT Reset 3.

The preferred circuit of FIG. 5 will now be described in greater detail with reference to FIG. 6. As shown in FIG. 6, initial synchronization layer 300 of slice 1 comprises a latch 402 which receives input signal Reset 1 at its D input and associated slice 1 clock signal BCLK 1 at its clock input, and provides an initial synchronization signal IS1 at its Q output in response to a rising edge of slice 1 clock signal BCLK 1. Latch 402 and the other latches described below are preferably D-type edge-triggered flip-flops, such as type DM54AS874, available from National Semiconductor Corporation.

Similarly, the initial synchronization layer of Slice 2 comprises a latch 404 which receives input signal Reset 2 at its D input and associated clock signal BCLK 2 at its clock input, and provides initial synchronization signal IS2 at its Q output. The initial synchronization layer of Slice 3 comprises a latch 406 which receives input signal Reset 3 at its D input and associated clock signal BCLK 3 at its clock input, and provides initial synchronization signal IS3 at its Q output.

Prior debounce of the raw reset input signals Reset 1, Reset 2 and Reset 3 is assumed, using conventional switch signal debounce techniques such as an R-C time constant at the input of a hysteresis-type Schmitt trigger, or a break-before-make switch coupled to a set-reset latch. To assure that each reset input signal is sampled only at one instant, thereby avoiding immediate timing divergence, the logic level of each of reset input signals Reset 1, Reset 2 and Reset 3 is latched in response to a rising edge of its respectively associated clock signal BCLK 1, BCLK 2 or BCLK 3, to produce initial synchronization signals IS1, IS2 and IS3, respectively.

Initial synchronization signals IS1, IS2 and IS3 are supplied to the local synchronization layer of all three slices. The local synchronization layer 310 of Slice 1 comprises a set of three latches 410, 412 and 414. Signal IS1 is supplied to the D input of latch 410, signal IS2 is supplied to the D input of latch 412, and signal IS3 is supplied to the D input of latch 414. Slice 1 clock signal BCLK 1 is supplied to the active-low inputs of latches 410, 412 and 414. Similarly, the local synchronization layer 312 of slice 2 comprises latches 416, 418 and 420, the respective D inputs of which receive signals IS1, IS2 and IS3, and the active-low clock inputs of which receive slice 2 clock signal BCLK 2. The local synchronization layer 314 of slice 3 comprises latches 422, 424 and 426, the respective D inputs of which receive signals IS1, IS2 and IS3, and the active-low clock inputs of which receive slice 3 clock signal BCLK 3.

Because clock signals BCLK 1, BCLK 2 and BCLK 3 are supplied to active-low clock inputs of the local synchronization layer, the local synchronization output signals of each slice are synchronized to a falling edge of the clock signal for that slice. That is, local synchronization signal LS1a provided at the Q output of latch 410 corresponds to initial synchronization signal IS1, but synchronized to a falling edge of Slice 1 clock signal BCLK 1. Signal LS1b provided at the Q output of latch 412 corresponds to signal IS2, synchronized to a falling edge of clock signal BCLK 1, and signal LS1c provided at the Q output of latch 414 corresponds to signal IS3, synchronized to a falling edge of clock signal BCLK 1. Similarly, Slice 2 local synchronization signals LS2a, LS2b and LS2c from respective latches 416, 418 and 420 correspond respectively to initial synchronization signals IS1, IS2 and IS3, and are synchronized to a falling edge of Slice 2 clock signal BCLK 2. Slice 3 local synchronization signals LS3a, LS3b and LS3c from respective latches 422, 424 and 426 correspond respectively to initial synchronization signals IS1, IS2 and IS3, and are synchronized to a falling edge of Slice 3 clock signal BCLK 3.

Figure 6:
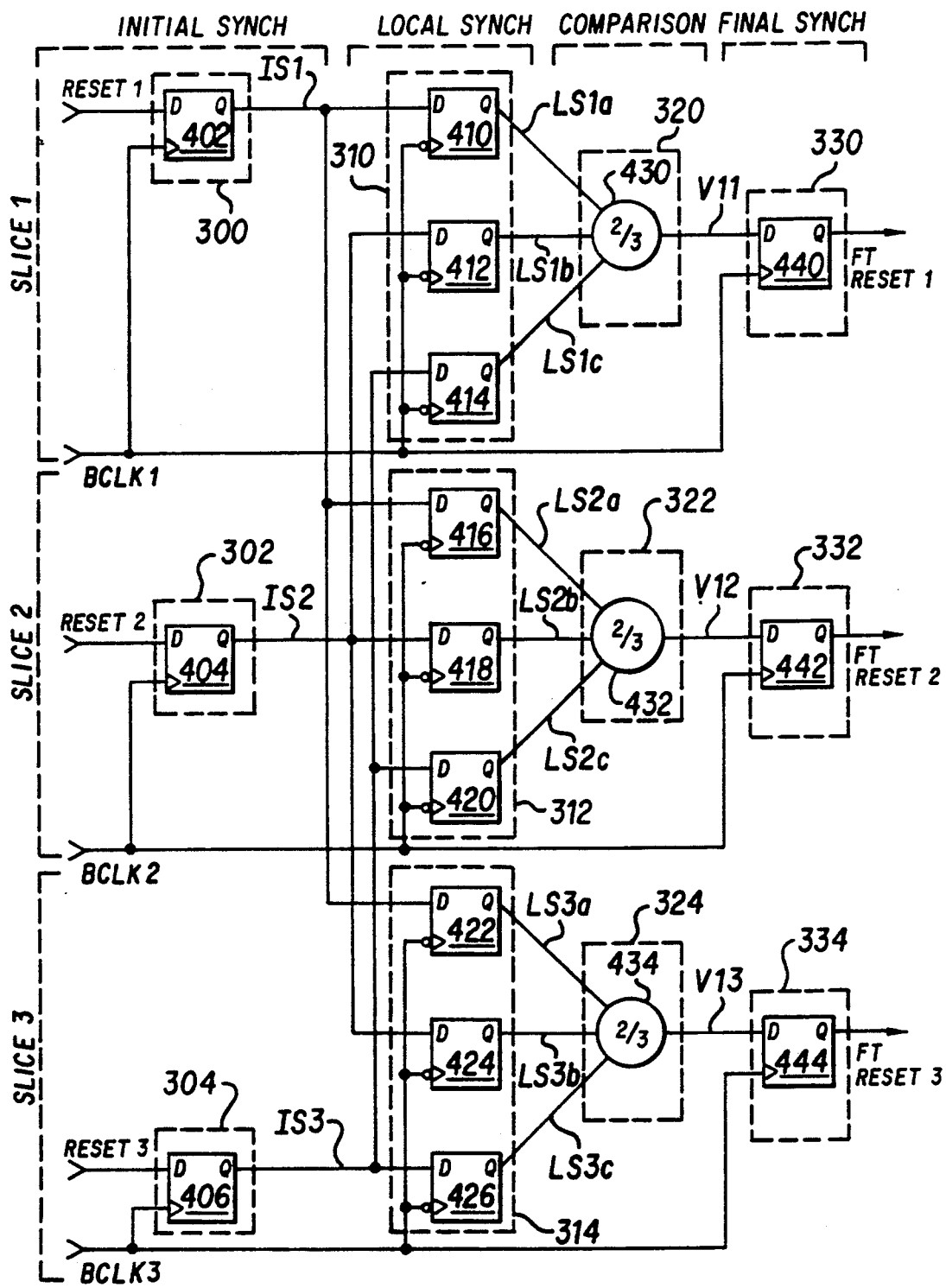
FIG. 6 shows in greater detail the circuit of FIG. 5.

The comparison layer of each slice of FIGS. 5 and 6 preferably comprises a conventional two-of-three majority voter circuit, examples of which are known in the art. As shown in FIG. 6, slice 1 comparison layer 320 comprises a two-of-three majority voter circuit 430, slice 2 comparison layer 322 comprises a two-of-three majority voter circuit 432, and slice 3 comparison layer 324 comprises a two-of-three majority voter circuit 434. Slice 1 voter circuit 430 receives signals LS1a, LS1b and LS1c at its respective inputs and supplies a majority-voted output signal V11 to the final synchronization layer 330 of Slice 1. Slice 2 voter circuit 432 receives signals LS2a, LS2b and LS2c at its respective inputs and supplies a majority-voted output signal V12 to the final synchronization layer 332 of Slice 2. Slice 3 voter circuit 434 receives signals LS3a, LS3b and LS3c at its respective inputs and supplies a majority-voted output signal V3 to the final synchronization layer of Slice 3.

The final synchronization layer of each slice serves to synchronize that slice's voted output signal to a rising edge of the clock signal for that slice. As shown in FIG. 6, slice 1 final synchronization layer 330 comprises a latch 440, slice 2 final synchronization layer 332 comprises a latch 442, and slice 3 final synchronization layer 334 comprises a latch 444. Latch 440 receives slice 1 voted output signal V11 at its D input and slice 1 clock signal BCLK 1 at its clock input, and provides a final timed output FT Reset 1 at its Q output which is synchronized to a rising edge of slice 1 clock signal BCLK 1. Latch 442 receives slice 2 voted output signal V12 at its D input and slice 2 clock signal BCLK 2 at its clock input, and provides a final timed output FT Reset 2 at its Q output which is synchronized to a rising edge of slice 2 clock signal BCLK 2. Latch 444 receives slice 3 voted output signal V13 at its D input and slice 3 clock signal BCLK 3 at its clock input, and provides a final timed output FT Reset 3 at its Q output which is synchronized to a rising edge of slice 3 clock signal BCLK 3.

Figure 7:
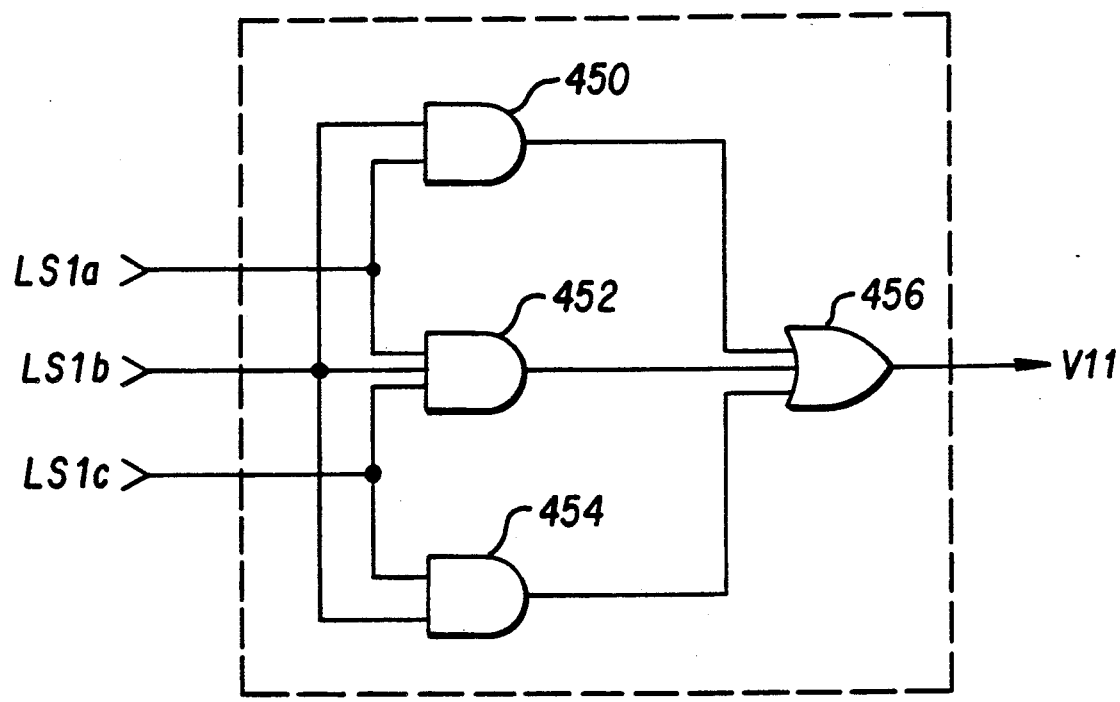
FIG. 7 shows a two-of-three voter circuit useful in the present invention.

Voter circuits 430, 432 and 434 may be of any suitable configuration, an example of which is shown in FIG. 7. In FIG. 7, two of the three input signals (for example, LS1a and LS1b of FIGS. 5 and 6) are supplied to the inputs of an AND gate 450, two of the three input signals (for example, LS1a and LS1c) are supplied to the inputs of an AND gate 452, and two of the three input signals (for example, LS1b and LS1c) are supplied to the inputs of an AND gate 454. The outputs of AND gates 450, 452 and 454 are supplied to the respective inputs of a three-input Or gate 456, which provides the voted output signal (for example, V11) of FIG. 5. Those skilled in the art will recognize that two-of-three majority voter circuits may also be constructed of other suitably-connected logical elements, such as three two-input NAND gates and a three-input NAND gate, three two-input OR gates and a three-input AND gate, or three two-input NOR gates and a three-input NOR gate.

Figure 8:
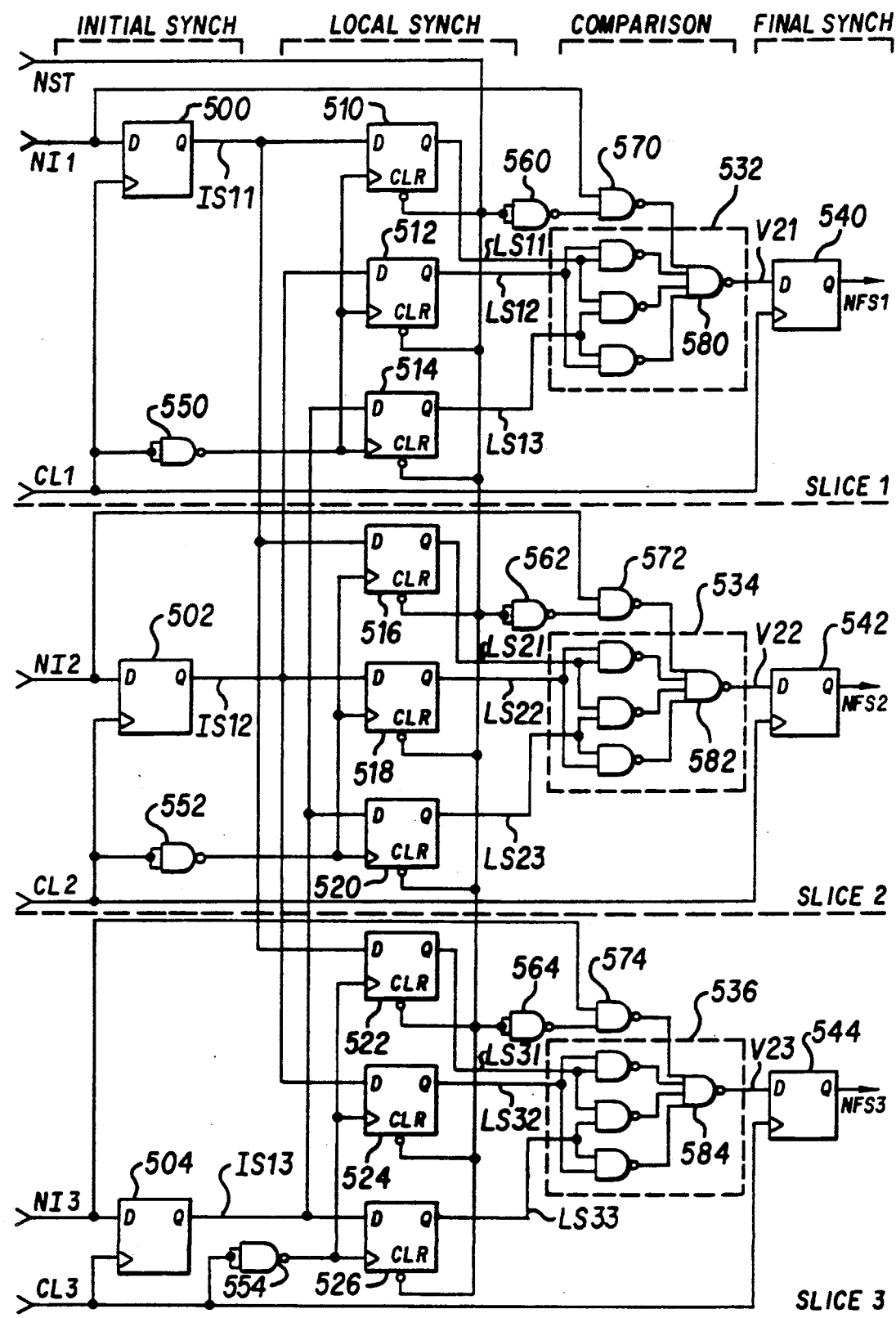
FIG. 8 shows a second preferred embodiment of a circuit according to the invention.

It is noted that the circuit shown in FIGS. 5 and 6 employs "positive" ("true") logic in which the input and output signals are considered active when in a logical "high" state. A further preferred embodiment of the invention which employs "negative" logic is shown in FIG. 8, in which respective slice 1, 2 and 3 input signals NI1, NI2 and NI3 and output signals NFS1, NFS2 and NFS3 are considered active when in a logical "low" state. Each of the input signals is obtained from other circuitry in a respective slice of a TMR fault-tolerant system. The input signals NI1, NI2 and NI3 are associated with respective slice 1, 2 and 3 clock signals CL1, CL2 and CL3. Input signals NI1, NI2 and NI3 may be reset signals, clock synchronization signals, external DMA (direct memory access) requests, interrupt signals, or the like.

The circuit of FIG. 8 is similar to that of FIGS. 5 and 6 in that it comprises three slices of circuitry (from top to bottom, slices 1, 2 and 3), each of which has four layers of circuitry for performing, respectively, (1) initial synchronization, (2) local synchronization, (3) comparison and (4) final sychronization. The initial sychronization layer of slice 1 comprises a latch 500, the initial synchronization layer of slice 2 comprises a latch 502 and the initial synchronization layer of slice 3 comprises a latch 504. The local synchroziation layer of slice 1 comprises a set of three latches 510, 512 and 514, the local synchronization layer of slice 2 comprises a set of three latches 516, 518 and 520, and the local synchronization layer of slice 3 comprises a set of three latches 522, 524 and 526. The comparison layer of each of slices 1, 2 and 3 of the circuit of FIG. 8 comprises a respective one of majority-voter circuits 532, 534 and 536. The final synchronization layer of each of slices 1, 2 and 3 comprises a respective one of latches 540, 542 and 544.

As shown in FIG. 8, active-low input signals NI1, NI2 and NI3 are supplied to the respective D inputs of latches 500, 502 and 504. Clock signals CL1, CL2 and CL3 are supplied to the respective clock inputs of latches 500, 502 an 504. Each of the initial synchronization output signals IS1, IS2 and IS3 from latches 500, 502 and 504 is provided to the D input of a respective latch in the local synchronization layer of each slice: slice 1 initial synchronization signal IS1 is supplied to latches 510, 516 and 522; slice 2 initial synchronization signal IS2 is supplied to latches 512, 518 and 524; and slice 3 initial synchronization signal IS3 is provided to latches 514, 520 and 526. In each slice, the clock signal for that slice is inverted and supplied to the clock input of all the initial synchronization latches for that slice: slice 1 clock signal CL1 is inverted in a NAND gate 550 having its input tied together, and supplied to the clock inputs of slice 1 local synchronization latches 510, 512 and 514; slice 2 clock signal CL2 is inverted in a NAND gate 552 having its inputs tied together, and supplied to the clock inputs of slice 2 local synchronization latches 516, 518 and 520; and slice 3 clock signal CL3 is inverted in an NAND gate 554 having its inputs tied together, and supplied to the clock inputs of slice 3 local synchronization latches 522, 524 and 526. Each of NAND gates 550, 552 and 554 may be replaced by an inverter.

Slice 1 local synchronization output signals LS11, LS12 and LS13 are supplied to the inputs of slice 1 voter circuit 532. Slice 2 local synchronization output signals LS21, LS22 and LS23 are supplied to the inputs of slice 2 voter circuit 534. Slice 3 local synchronization output signals LS31, LS32 and LS33 are supplied to the inputs of slice 3 voter circuit 536. In each slice, the output of the majority voter is supplied to the D input and the slice's clock is supplied to the clock input of a final synchronization latch: slice 1 voter output signal V21 and slice 1 clock signal CL1 are supplied to final synchronization latch 540, slice 2 voter output signal V22 and slice 2 clock signal CL2 are supplied to final synchronization latch 542, and slice 3 voter output signal V23 and slice 3 clock signal CL3 are supplied to final synchronization latch 544. Slice 1 final synchronization latch 540 provides at its output an active-low output signal NFS1, slice 2 final synchronization latch 542 provides at its output an active-low output signal NFS2, and slice 3 final synchronization latch 544 provides at its output an active-low output signal NFS3.

The circuit of FIG. 8 further includes an override feature which permits the synchronization of signals performed by the circuit to be bypassed for "Single Thread" operation of the TMR system. Single Thread operation, also known as "single lane" operation, is sometimes used to operate a single Slice of the TMR system for performing tests on that Slice or for temporarily continuing operation (without redundancy) of a Slice which is known to be good when the other Slices have failed.

To activate Single Thread operation, an active-low signal NST is provided to the active-low clear (CLR) inputs of local synchronization latches 510, 512, 514, 516, 518, 520, 522, 524 and 526. The NST signal is also inverted in NAND gates 560, 562 and 564 and supplied to one input of each of NAND gates 570, 572 and 574. The remaining input of each of NAND gates 570, 572 and 574 is coupled to receive a respective one of input signals NI1, NI2 or NI3. The output signals from NAND gates 570, 572 and 574 are supplied respectively to a fourth input of a four-input NAND gate at the final stage of each of voter circuits 532, 534 and 536.

When signal NST is in the inactive "high" state, the circuit of FIG. 8 provides respective slice 1, 2 and 3 output signals NFS1, NFS2 and NFS3 which are mutually synchronized (within the limits of the skew between clock signals CL1, CL2 and CL3) and synchronized to the respective slice 1, 2 and 3 clock signals CL1, CL2 and CL3, as will be described more fully below. When signal NST is in the active "low" state, input signals NI1, NI2 and NI3 are gated through respective voter circuits 532, 534 and 536 via respective NAND gates 570, 572 and 574 so that the final synchronization output NFS1, NFS2, NFS3 simply follow the respective inputs NI1, NI2, NI3. For this purpose, the final NAND gates 580, 582 and 584 of respective voter circuits 532, 534 and 536 are four-input NAND gates.

The circuit of FIG. 8 is preferably constructed of Dual 4-Bit D-Type Edge-Triggered Flip-Flops such as type DM54AS847, Hex 2-Input NAND Drivers such as type DM54AS804B, and Dual 4-Input NAND Gates such as type DM54AS20, all of which are available from National Semiconductor Corporation. The active-low clear inputs (not shown) of latches 500, 502, 504, 540, 542 and 544 are held at a "high" logic state (not shown) so that the output signals at their respective Q outputs will track the signals applied to their respective D inputs as described further below.

Figure 9:
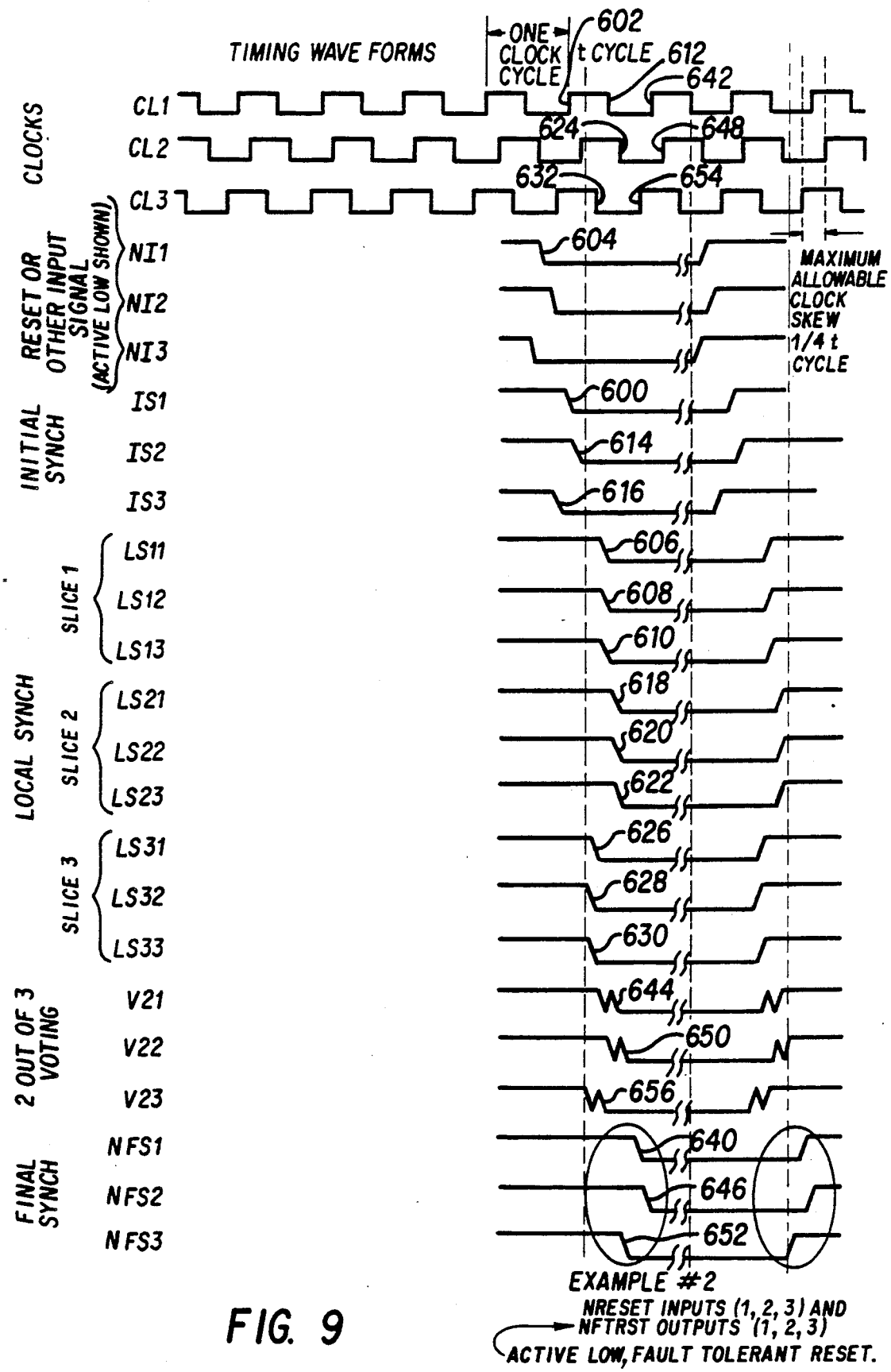
FIGS. 9-12 are timing diagrams illustrating various examples of the operation of the circuit of FIG. 8.

Operation of the circuit of FIG. 8 in its normal, or non-Single-Thread, mode will now be described with reference to various signal timing examples illustrated in FIGS. 9–12, in which clock signals CL1, CL2 and CL3 are of the same frequency and are phase coherent, but may be skewed with respect to one another by as much as ¼ clock cycle. In the example of FIG. 9, active-low input signals NI1, NI2 and NI3 are shown in timing relationship to their respective clock signals CL1, CL2 and CL3. Outputs signals of the initial synchronization, local synchronization and voting stages are as illustrated. Each of initial synchronization outputs IS1, IS2 and IS3 changes state on the arrival of the first rising clock edge of the associated clock signal following a change of state of the associated input signal NI1, NI2, or NI3. For example, slice 1 initial synchronization signal IS1 changes state at 600 in response to rising edge 602 of slice 1 clock signal CL1 following change of state 604 of slice 1 input signal NI1.

Because the clock signals provided to the local synchronization layer of the circuit are inverted in NAND gates 550, 552 and 554, the local synchronization output signals of each slice change state on the next falling edge of the clock signal for that slice. For example, slice 1 local synchronization signals LS11–LS13 change state at 606, 608 and 610, respectively, on the next falling edge 612 of slice 1 clock signal CL1 which follows the changes of state 600, 614 and 616 or respective initial synchronization signals LS11–LS13. Similarly, slice 2 local synchronization signals LS21–LS23 change state at 618, 620 and 622, respectively, on falling edge 624 of slice 2 clock signal CL2, and slice 3 local synchronization signals LS31–LS33 change state at 626, 628 and 630 on falling edge 632 of slice 3 clock signal CL3.

Respective slice 1, 2 and 3 voter circuit output signals V21, V22 and V23 are shown as taking some time to settle. Each of voter circuit output signals V21, V22 and V23 represents the majority vote of the local synchronization signals for its slice.

Each of final synchronization signals NFS1, NFS2 and NFS3 changes state at the first rising edge of respective clock signal CL1, CL2 or CL3 which follows a change of state of respective voter output signals V21, V22 and V23. For example, slice 1 final synchronization output signal NFS1 changes state at 640 in response to rising edge 642 of slice 1 clock signal CL1 which follows change of state 644 of slice 1 voter signal V21, slice 2 final synchronization output signal NFS2 changes state at 646 in response to rising edge 648 of slice 2 clock signal CL2 which follows change of state 650 of slice 2 voter signal V22, and slice 3 final synchronization output signal NFS3 changes state at 652 in response to rising edge 654 of slice 3 clock signal CL3 which follows change of state 656 of slice 3 voter signal V23.

The resulting final synchronization output signals NFS1, NFS2, NFS3 are "identical" in that they change state on the "same" rising edge of their respective clock signals, where such rising clock edges are within the skew between clock signals CL1, CL2 and CL3. No ambiguity of fault is perceived by the TMR system. Since each slice uses the rising edge of its own clock signal, i.e, the same clock that goes to its processor, proper setup time for reset using the final synchronization signals is observed.

Figure 10:
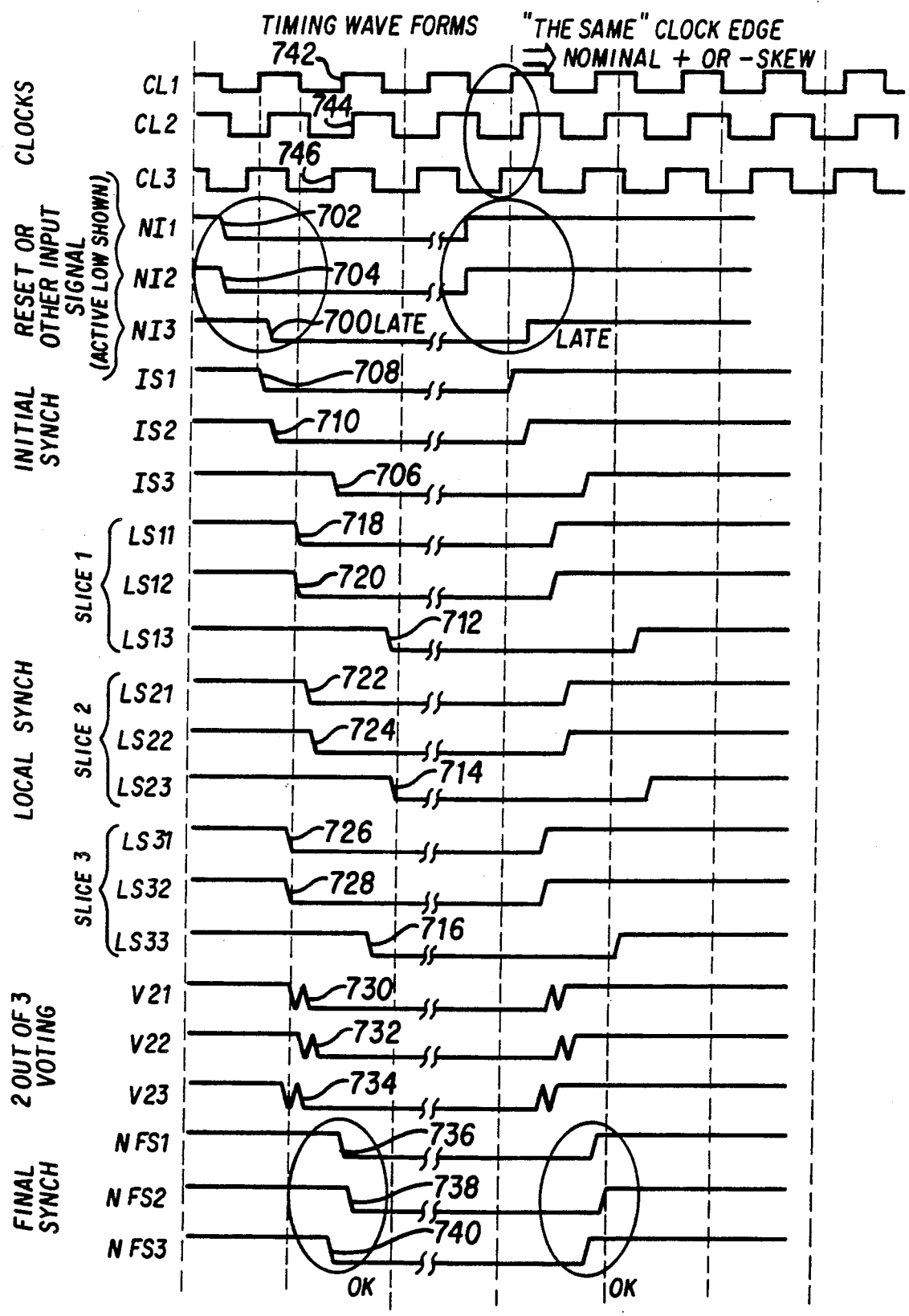

FIG. 10 illustrates a second timing example for the circuit of FIG. 8 in which a change of state 700 of slice 3 input signal NI3 arrives approximately one clock cycle later than respective changes of state 702 and 704 of slice 1 and 2 input signals NI1 and NI2. As a result, change of state 706 of slice 3 initial synchronization signal IS3 is approximately one clock cycle late with respect to respective changes of state 708 and 710 of slice 1 and 2 initial synchronization signals IS1 and IS2.

Accordingly, respective changes of state 712, 714 and 716 of local synchronization signals LS13, LS23 and LS33 (all of which are derived from initial synchronization signal IS3) are approximately one clock cycle retarded with respect to corresponding changes of state 718–720, 722–724 and 726–728 of the other local synchronization signals.

However, the voter circuit of each slice provides an output signal which is correct as to majority value and timing. For example, slice 1 voter signal V21 changes state at 730 when changes of state 718 and 720 of respective slice 1 local synchronization signals LS11 and LS12 are detected, slice 2 voter signal V22 changes state at 732 when changes of state 722 and 724 of respective slice 2 local synchronization signals LS21 and LS22 are detected, and slice 3 voter signal V23 changes state at 734 when changes of state 726 and 728 of respective slice 3 local synchronization signals LS31 and LS32 are detected. Final synchronization output signals NFS1, NFS2 and NFS3 therefore change state at 736, 738 and 740 in response to respective rising edges 742, 744 and 746 of respective slice 1, 2 and 3 clock signals CL1, CL2 and CL3. Changes of state 736, 738 and 740 of final synchronization signals NFS1, NFS2 and NFS3 occur at the "same" clock edge (i.e., clock edges within the bounded skew) of their respective clock signals. Final synchronization signals NFS1, NFS2 and NFS3 are thus mutually synchronized (within the limits of the skew between the clock signals) and are synchronized with their respectively associated clock signals CL1, CL2 and CL3, despite the late arrival of input signal NI1 relative to input signals NI2 and NI3.

Figure 11:
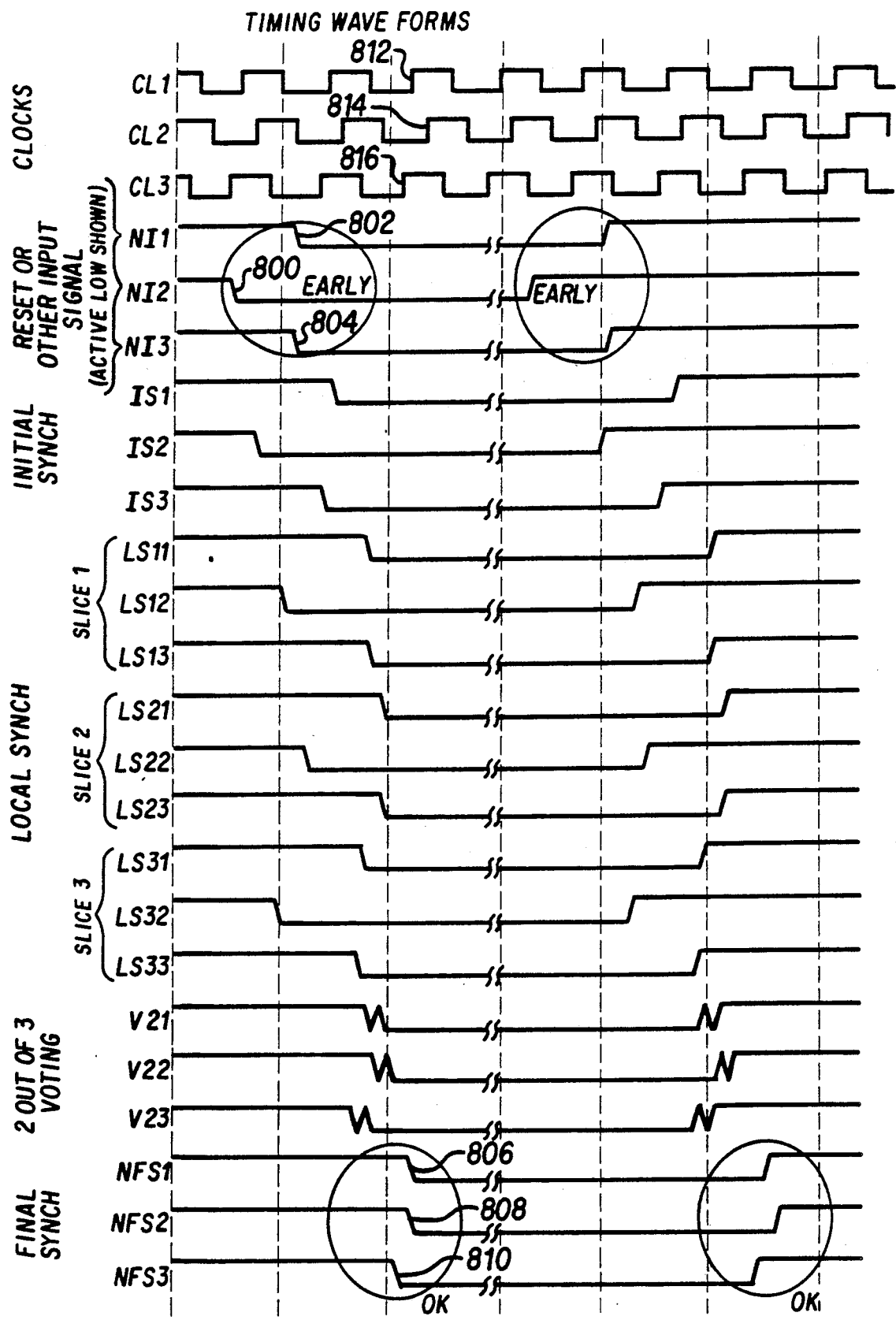
Figure 12:
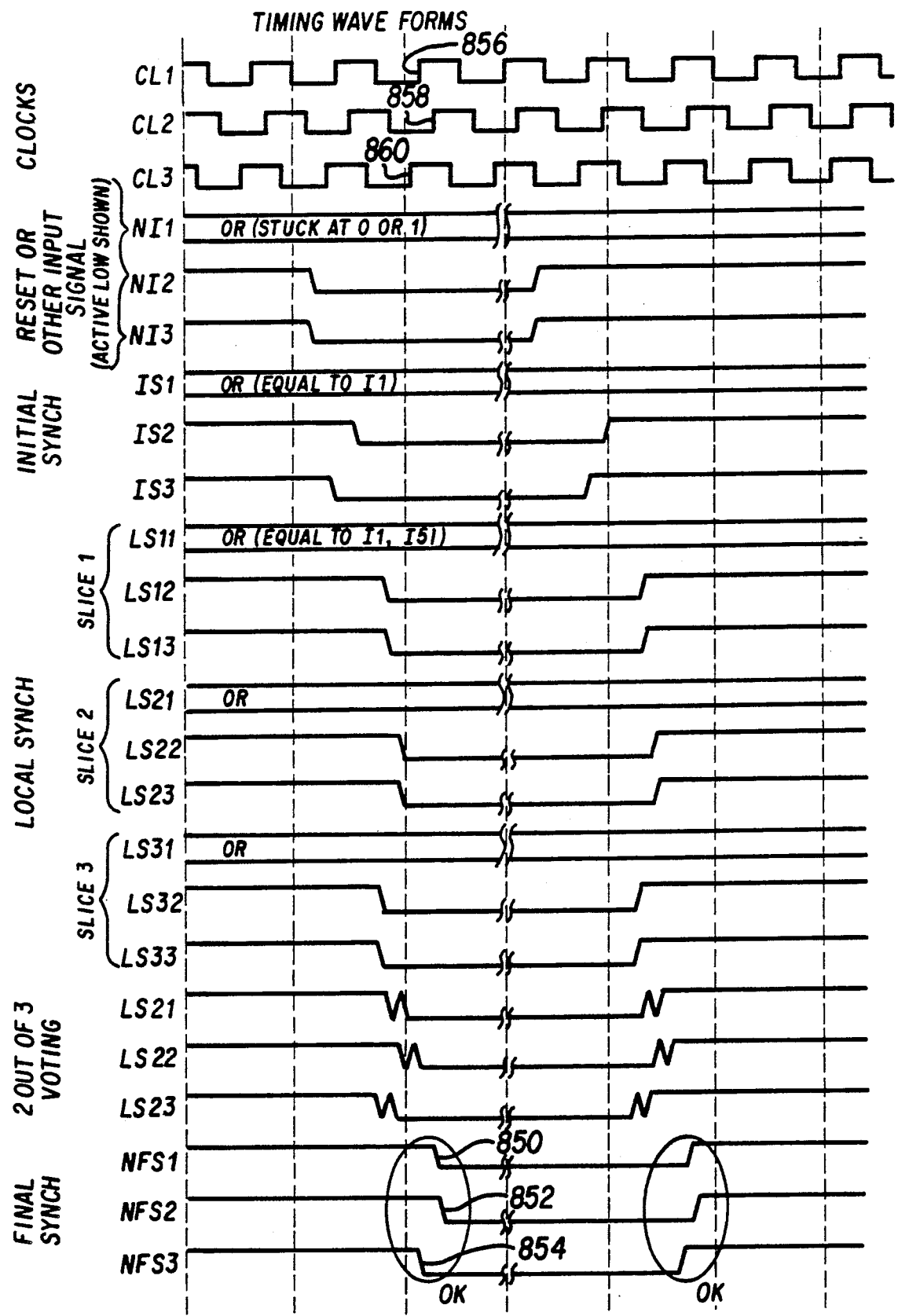

FIG. 11 illustrates a third timing example for the circuit of FIG. 8. In this case, change of state 800 of slice 2 input signal NI2 arrives approximately one clock cycle earlier than respective changes of state 802 and 804 of input signals NI1 and NI3. Again, the circuit provides output signals NFS1, NFS2 and NFS3 which change state (at 806, 808 and 810, respectively) in response to the "same" rising edge (i.e., rising edges 812, 814 and 818, which are within the skew between the clock signals) of their respective clock signals. Final synchronization output signals NFS1, NFS2 and NFS3 are thus mutually synchronized (within the limits of the skew between the clock signals) and synchronized with respectively associated clock signals CL1, CL2 and CL3, despite the early arrival of event 800 of output signal NI2. FIG. 12 illustrates a fourth timing example for the circuit of FIG. 8. In this example, slice 1 input signal NI1 is missing (frozen at a logical "0" or at a logical "1" level), while respective slice 2 and 3 input signals NI2 and NI3 are functioning normally. Again, the circuit provides output signals NFS1, NFS2 and NFS3 which change state at 850, 852 and 854, respectively, in response to the "same" rising edge of respective clock signals CL1, CL2 and CL3 (i.e., rising edges 856, 858 and 860, which are within the skew between the clock signals). Final synchronization output signals NFS1, NFS2 and NFS3 are thus mutually synchronized (within the limits of the skew between their respective clock signals) and synchronized with their respectively associated clock signals CL1, CL2 and CL3, despite the absence of a change of state in input signal NI1.

Figure 13:
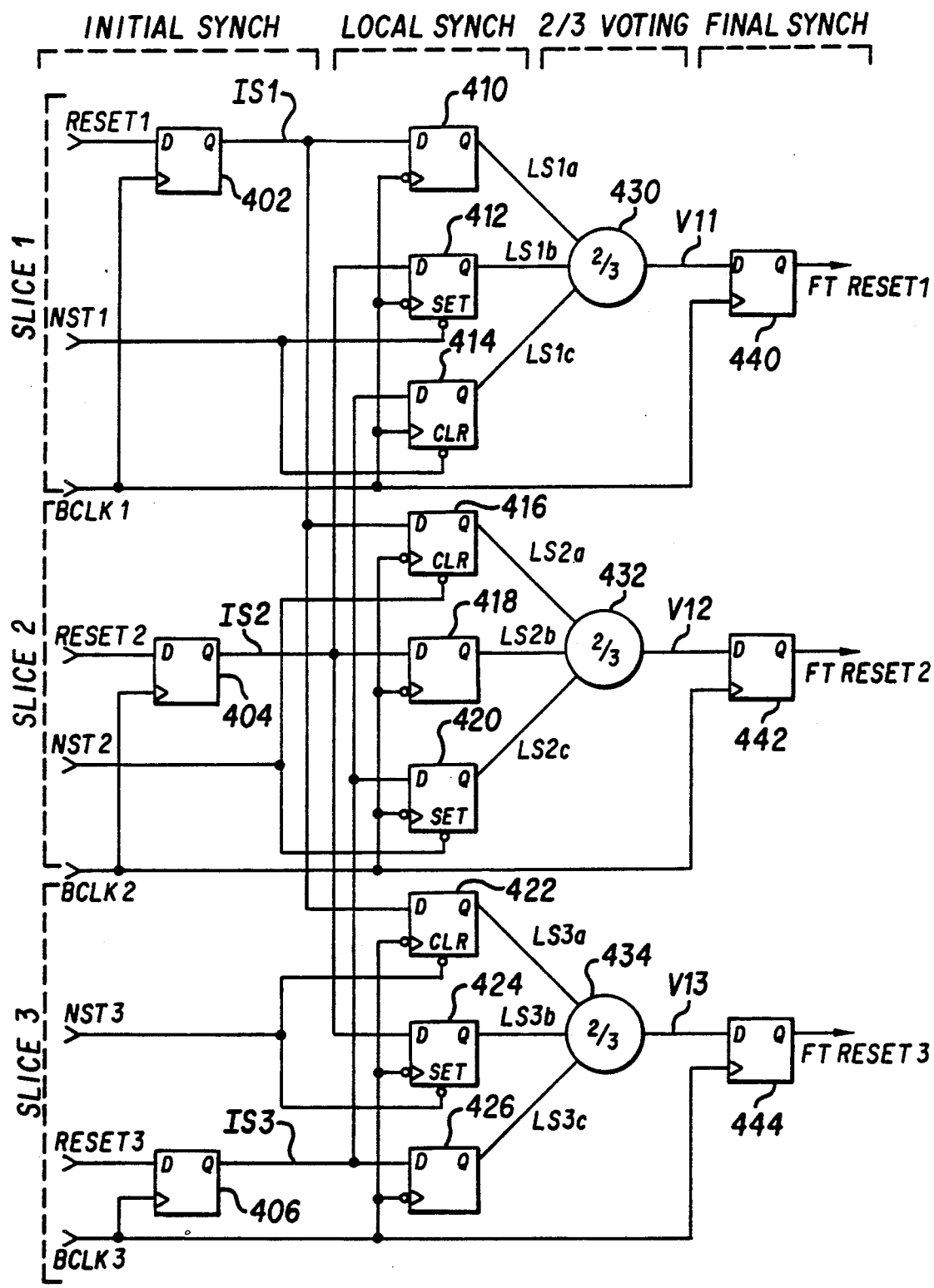
FIG. 13 shows a modification of the Single Thread feature of FIG. 8.

It will be recalled that the Single Thread command signal NST in FIG. 8, when in its active-low state, causes the local synchronization latches 510–526 to be cleared and the input signals NI1–NI3 to be passed to the 4-input NAND gates 580–584 of respective voter circuits 532–536, such that output signals NFS1–NFS3 respectively track input signals NI1–NI3. FIG. 13 shows a modification of the circuit of FIG. 6 requiring fewer components to implement the Single Thread feature than does the arrangement of FIG. 8. Like components and signals in FIGS. 6 and 13 are labelled alike and will be described here only as necessary to describe the functioning of the Single Thread feature of FIG. 13.

As shown in FIG. 13, latches 412, 420 and 424 each have active-low set ("SET") inputs and latches 414, 416 and 422 each have active-low clear ("CLR") inputs, in addition to their respective D inputs, clock inputs and Q outputs. To activate Single Thread operation of slice 1, active-low Single Thread activation signal NST1 (supplied to the active-low set ("SET") and clear ("CLR") inputs of latches 412 and 414, respectively) assumes an active-low logic level. When this occurs, local synchronization signal LS1$b$ is held at a logic high level and local synchronization signal LS1$c$ is held at a logic low level. Voted output signal V11 therefore tracks local synchronization signal LS1$a$, which in turn tracks input signal Reset 1, in Single Thread operating mode. Single Thread operation of slice 1 is disabled when signal NST1 assumes an inactive-high logic level.

To activate Single Thread operation of slice 2, active-low Single Thread activation signal NST2 (supplied to the active-low set ("SET") and clear ("CLR") inputs of latches 420 and 416, respectively) assumes an active-low logic level. When this occurs, local synchronization signal LS2$c$ is held at a logic high level and local synchronization signal LS2$a$ is held at a logic low level. Voted output signal V12 therefore tracks local synchronization signal LS2$b$, which in turn tracks input signal Reset 2, in Single Thread operating mode. Single Thread operation of slice 2 is disabled when signal NST2 assumes an inactive-high logic level.

To activate Single Thread operation of slice 3, active-low Single Thread activation signal NST3 (supplied to the active-low set ("SET") and clear ("CLR") inputs of latches 424 and 422, respectively) assumes an active-low logic level. When this occurs, local synchronization signal LS3$b$ is held at a logic high level and local synchronization signal LS3$a$ is held at a logic low level. Voted output signal V13 therefore tracks local synchronization signal LS3$c$, which in turn tracks input signal Reset 3, in Single Thread operating mode. Single Thread operation of slice 3 is disabled when signal NST3 assumes an inactive-high logic level.

Other modifications to the illustrated circuits are also possible within the spirit and scope of the invention, such as modification of the use of clock signals. For example, the local and final synchronization layers may use the same (either rising or falling) clock edge, so long as the initial and local synchronization layers use opposite edges (edges which are ½ cycle out of phase with one another). If clock and clock-bar (inverted clock) signals are available in the TMR system, these can be used and the clock signal inverters (such as NAND gates 550–554 of FIG. 8) deleted.

Other modifications are also possible. For example, although the described and illustrated embodiments are for Triple Modular Redundant operation, the circuits may be readily adapted for simple pairs operation, using comparators in place of the majority voting logic, or for modular redundant operation of more than three slices. Logical equivalent circuits may be substituted for all or portions of the described circuits, logic polarity can be reversed, additional isolation may be added, and/or masked or self-checking logic circuits such as dual-rail logic may be used in place of the illustrated logic elements.

While the preferred embodiments of the present invention have been illustrated and described, it is to be understood that the invention is not limited to the precise construction disclosed herein, but is to include all changes and modifications coming within the scope of the invention as defined in the appended claims.

The invention claimed is:

1. Apparatus for synchronizing multiple digital input signals, wherein each said input signal is associated with a clock signal, and said clock signals have a defined period and are skewed relative to one another, said apparatus comprising:
   first means responsive to said input signals and said clock signals for producing an initial synchronization signal corresponding to each said input signal and which is synchronized with the beginning of a period of the clock signal associated with said input signal;
   second means responsive to said initial synchronization signals and said clock signals for producing a respective set of local synchronization signals for each said clock signal, each said set of local synchronization signals corresponding to said initial synchronization signals and being synchronized with the midpoint of a period of the respective clock signal;
   third means responsive to said local synchronization signals for comparing each said set of local synchronization signals and for producing a comparison output signal for each said comparison; and
   fourth means responsive to said comparison output signals and said clock signals for producing a final synchronization signal for each said comparison output signal, each said final synchronization signal being synchronized with the beginning of a clock period of the same clock signal with which the set of local synchronization signals used to produce the comparison output signal was synchronized, such that said final synchronization signals are mutually synchronized within the limits of the skew between said clock signals.

2. The apparatus of claim 1, wherein the sum of (a) the skew between said clock signals, and (b) the output delay of said first means, and (c) the input setup of said second means, equals less than one-half of said defined period.

3. The apparatus of claim 1, wherein said first means comprises a set of latches, each said latch coupled to receive a respective one of said input signals and the associated said clock signal and to produce one of said initial synchronization signals.

4. The apparatus of claim 1, wherein said second means comprises a set of latches, each said latch coupled to receive one of said initial synchronization signals and one of said clock signals and to produce one of said local synchronization signals.

5. The apparatus of claim 1, wherein at least three of said digital output signals are provided as inputs and said third means comprises a set of voting circuits, each said voting circuit coupled to receive one said set of said local synchronization signals, whereby said comparison output signal represents the logical majority vote of said set of local synchronization signals.

6. The apparatus of claim 1, wherein said fourth means comprises a set of latches, each said latch coupled to receive a respective one of said comparison output signals and an associated one of said clock signals and to produce one of said final signals.

7. The apparatus of claim 1, further comprising means responsive to an override signal for overriding synchronization of said input signals.

8. The apparatus of claim 7, wherein said overriding means comprises means for holding in a cleared state the outputs of said third means and bypassing said input signals to said fourth means.

9. The apparatus of claim 1, wherein said second means is responsive to an override signal for producing at least one set of local synchronization signals which, when applied to said third means, results in a comparison output signal corresponding to one of said input signals.

10. A method of synchronizing multiple digital input signals, wherein each said input signal is associated with a clock signal, and said clock signals have a defined period and are skewed relative to one another, comprising the steps of:
   a. producing an initial synchronization signal corresponding to each said input signal and which is synchronized with the beginning of a period of the clock signal associated with said input signal;
   b. producing a respective set of local synchronization signals for each said clock signal, each said set of local synchronization signal corresponding to said initial synchronization signals and being synchronized with the midpoint of a period of the respective clock signal;
   c. comparing each said set of local synchronization signals and producing a comparison output signal for each said comparison; and
   d. producing a final synchronization signal for each said comparison output signal, each said final synchronization signal being synchronized with the beginning of a clock period of the same clock signal with which the set of local synchronization signals used to produce the comparison output signal was synchronized, whereby said final synchronization signals are mutually synchronized within the limits of the skew between said clock signals.

11. The method of claim 10, wherein step c. comprises logically comparing the local synchronization signals of said set with one another such that said comparison output signal comprises a logical majority voted output.

12. Apparatus for synchronizing multiple digital input signals, wherein each said input signal is associated with a clock signal and said clock signals have a defined period and are skewed relative to one another, said apparatus comprising for each said input signal:
   first means responsive to said input signal and to the clock signal associated with said input signal for producing an initial synchronization signal which corresponds to said input signal and which is synchronized to the beginning of a period of said associated clock signal;
   second means responsive to said initial synchronization signal, to the clock signal associated with said input signal, and to the initial synchronization signals produced in response to the other of said input signals, for producing a set of local synchronization signals which correspond to said initial synchronization signals and which are synchronized to the midpoint of a period of the clock signal associated with said input signal;
   third means for comparing said set of local synchronization signals and producing a comparison output signal; and
   fourth means responsive to said comparison output signal and to the clock signal associated with said input signal for producing a final synchronization signal which corresponds to said comparison output signal and which is synchronized to the beginning of a period of the clock signal associated with said input signal, such that said final synchronization signals are synchronized to one another within the limits of the skew between said clock signals.

13. The apparatus of claim 12, wherein the sum of (a) the skew between said clock signals, and (b) the output delay of said first means, and (c) the input setup of said second means, equals less that one-half of said defined period.

14. The apparatus of claim 13, wherein said first means comprises a latch coupled to receive said input signal and the clock signal associated with said input signal and to produce one of said initial synchronization signals.

15. The apparatus of claim 14, wherein said second means comprises a set of latches, each said latch coupled to receive one of said initial synchronization signals and the clock signal associated with said input signal and to produce one of said local synchronization signals.

16. The apparatus of claim 15, wherein at least three of said digital input signals are provided as inputs and said third mens comprises a majority voting circuit coupled to receive one said set of said local synchronization signals and to produce said comparison output signal, whereby said comparison output signal represents the logical majority vote of said set of local synchronization signals.

17. The apparatus of claim 16, wherein said fourth means comprises a latch coupled to receive said comparison output signal and said clock signal associated with said input signal and to produce said final synchronization signals.

18. The apparatus of claim 17, further comprising means responsive to an override signal for overriding synchronization of said input signals.

19. The apparatus of claim 18, wherein said overriding means comprises means for holding in a cleared state the outputs of said third means and bypassing said input signals to said fourth means.

20. The apparatus of claim 12, wherein said second means is responsive to an override signal for producing said set of local synchronization signals such that, when said set of local synchronization is applied to said third means, said comparison output signal corresponds one of said input signals.

21. A method of synchronizing multiple digital input signals, wherein each said input signal is associated with a clock signal and said clock signals have a defined period and are skewed relative to one another, comprising for each said input signal the steps of:

producing an initial synchronization signal which corresponds to said input signal and which is synchronized to the beginning of a period of said associated clock signal;

producing, for each said clock signal, a set of local synchronization signals which correspond to said initial synchronization signals and which are synchronized to the midpoint of said clock signal;

comparing said set of local synchronization signals and producing a comparison output signal; and producing a final synchronization signal which corresponds to said comparison output signal and which is synchronized to the beginning of a period of the clock signal associated with said input signal, whereby said final synchronization signals are mutually synchronized within the limits of the skew between said clock signals.

22. Apparatus for synchronizing multiple digital signals associated with respective clock signals, comprising:

a. means responsive to said digital signals and to said clock signals for producing a set of initial synchronization signals;

b. means responsive to said clock signals and said initial synchronization signals for producing a set of local synchronization signals for each said clock signal;

c. means responsive to said local synchronization signals for producing a set of comparison signals;

d. means responsive to said clock signals and said comparison signals for producing a set of final synchronization signals, such that said final synchronization signals are mutually synchronized and synchronized to their respective associated clock signals.

23. A method of synchronizing multiple digital signals associated with respective clock signals, comprising the steps of:

a. producing a set of initial synchronization signals in response to said digital signals and to said clock signals;

b. producing multiple sets of local synchronization signals in response to said clock signals and said initial synchronization signals, each said set of local synchronization signals corresponding to one of said clock signals;

c. producing a set of comparison signals in response to said local synchronization signals;

d. producing a set of final synchronization signals in response to said clock signals and said comparison signals, said final synchronization signals being mutually synchronized and synchronized to respective associated clock signals.

* * * * *